(12) United States Patent
Skrzypczak et al.

(10) Patent No.: US 11,404,234 B2
(45) Date of Patent: Aug. 2, 2022

(54) PROCESS FOR MANUFACTURING SEALED AUTOMOTIVE ELECTRICAL FUSE BOX

(71) Applicant: Littelfuse, Inc., Chicago, IL (US)

(72) Inventors: Michael Skrzypczak, Chicago, IL (US); Keith Jozwik, Chicago, IL (US)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 15/931,761

(22) Filed: May 14, 2020

(65) Prior Publication Data

US 2021/0358709 A1 Nov. 18, 2021

(51) Int. Cl.
| | | |
|---|---|---|
| *H01H 85/20* | (2006.01) | |
| *B29C 45/14* | (2006.01) | |
| *B29C 45/73* | (2006.01) | |
| *H01H 85/175* | (2006.01) | |
| *B29L 31/36* | (2006.01) | |
| *H01H 69/02* | (2006.01) | |

(52) U.S. Cl.
CPC ..... *H01H 85/201* (2013.01); *B29C 45/14311* (2013.01); *B29C 45/73* (2013.01); *H01H 85/175* (2013.01); *H01H 85/20* (2013.01); *H01H 85/2045* (2013.01); *B29L 2031/36* (2013.01); *H01H 69/02* (2013.01); *H01H 2085/206* (2013.01); *H01H 2085/2055* (2013.01); *H01H 2229/047* (2013.01); *H01H 2229/048* (2013.01)

(58) Field of Classification Search
CPC ............... B29C 45/14311; B29C 45/73; B29L 2031/36; H01H 69/02; H01H 85/175; H01H 85/201; H01H 85/2045; H01H 85/20; H01H 2085/2055; H01H 2085/206; H01H 2229/047; H01H 2229/048

See application file for complete search history.

(56) References Cited

U.S. PATENT DOCUMENTS

| | | | | |
|---|---|---|---|---|
| 4,342,881 A | * | 8/1982 | Fukuda | H02G 5/005 174/72 B |
| 9,831,056 B2 | * | 11/2017 | Mochizuki | H01H 83/20 |
| 2003/0024105 A1 | * | 2/2003 | Chiu | H01H 85/0411 29/623 |
| 2007/0018774 A1 | * | 1/2007 | Dietsch | H01H 85/055 337/159 |
| 2007/0075822 A1 | * | 4/2007 | Pachla | H01H 85/0411 337/297 |

(Continued)

FOREIGN PATENT DOCUMENTS

| | | |
|---|---|---|
| EP | 1424713 A1 | 6/2004 |
| JP | H07-21892 A | 1/1995 |
| JP | H08-188626 | 7/1996 |

OTHER PUBLICATIONS

European Search Report dated Oct. 15, 2021 for European Patent Application No. 21172674.0.

*Primary Examiner* — Jacob R Crum
(74) *Attorney, Agent, or Firm* — KDB Firm PLLC

(57) ABSTRACT

A fuse assembly including a fuse connected to two busbars, an injection molded base and an injection molded cover. The busbars are powder-coating with a powder-based adhesive or adhesion promoter, then cured in an oven. The busbars are then placed in the cavity image of an injection molding apparatus. Plastic is heated to a liquid form and injected into the cavity image. The resulting injection molded base is resistant to both dust and water, protecting the fuse inside.

14 Claims, 4 Drawing Sheets

(56) References Cited

U.S. PATENT DOCUMENTS

| | | | |
|---|---|---|---|
| 2008/0191832 A1* | 8/2008 | Tsai | H01H 85/046 337/297 |
| 2009/0211089 A1 | 8/2009 | Hughes et al. | |
| 2010/0173509 A1* | 7/2010 | Holbrook | H05K 7/1432 439/208 |
| 2010/0178813 A1* | 7/2010 | Holbrook | H05K 7/1432 439/775 |
| 2011/0211246 A1 | 9/2011 | Agrawal et al. | |
| 2012/0223801 A1 | 9/2012 | Moon | |
| 2013/0069001 A1 | 3/2013 | Luo et al. | |
| 2014/0306795 A1* | 10/2014 | Kato | H01H 69/02 337/401 |
| 2014/0356671 A1* | 12/2014 | Dawley | G01R 31/364 429/90 |
| 2018/0294126 A1* | 10/2018 | de Leon | H01H 85/18 |
| 2019/0315031 A1* | 10/2019 | Asahi | B29C 45/14639 |

* cited by examiner

PROCESS FOR MANUFACTURING SEALED AUTOMOTIVE ELECTRICAL FUSE BOX

FIELD OF THE DISCLOSURE

Embodiments of the present disclosure relate to the field of fuses, and, more particularly, to a dust- and moisture-resistant fuse enclosure.

BACKGROUND

Fuses are used in a variety of circuits to protect electronic components from overcurrent events. Fuses come in a variety of shapes and sizes. For some applications, such as circuit protection in extreme environments, the fuse may be contained within a closed structure known as an electrical fuse box. Although the fuse is contained therein, it is a continuous challenge in such extreme environments to ensure that the fuse is not damaged such as by dust or moisture entering the electrical fuse box.

It is with respect to these and other considerations that the present improvements may be useful.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

In various embodiments, an injection molded base for production of a fuse assembly is prepared by a process including the steps of covering a portion of a busbar with a sealant, inserting the busbar into a cavity image of an injection molding apparatus, wherein the portion of the busbar is inside the cavity image, injecting melted plastic into the cavity image, and removing the injection molded base from the cavity image.

In one embodiment, a method of manufacturing a fuse assembly in accordance with the present disclosure includes coating a busbar with a sealant, the sealant including a powder, baking the busbar in an oven until the sealant is cured onto the busbar, inserting the busbar into a cavity image of an injection molding apparatus, wherein a portion of the busbar is inside the cavity image, filling the cavity image with melted plastic at high pressure, wherein the melted plastic and the sealant form a bonded material that cannot be subsequently separated by heating, and removing a plastic base and the busbar of the fuse assembly from the cavity image.

In another embodiment, a fuse assembly in accordance with the present disclosure includes a fuse, a first busbar for establishing a first electrical connection between a circuit and a first side of the fuse, a second busbar for establishing a second electrical connection between the circuit and a second side of the fuse, and an injection molded base including a first opening through which the first busbar is disposed and a second opening through which the second busbar is disposed, wherein the injection molded base is manufactured by covering a first portion of the first busbar with a sealant, covering a second portion of the second busbar with the sealant, inserting the first busbar and the second busbar into a cavity image of an injection molding apparatus, wherein the first portion and the second portion are inside the cavity image, injecting hot melted plastic into the cavity image, wherein the sealant fills the first and second openings.

DETAILED DESCRIPTION

A method of manufacturing a dust- and moisture-resistant fuse assembly in accordance with the present disclosure will now be described more fully hereinafter with reference to the accompanying drawings, in which preferred embodiments of the present disclosure are presented. The method of the present disclosure may, however, be embodied in many different forms and should not be construed as being limited to the embodiments set forth herein. Rather, these embodiments are provided so that this disclosure will convey certain exemplary aspects of the method to those skilled in the art.

Figure 1:
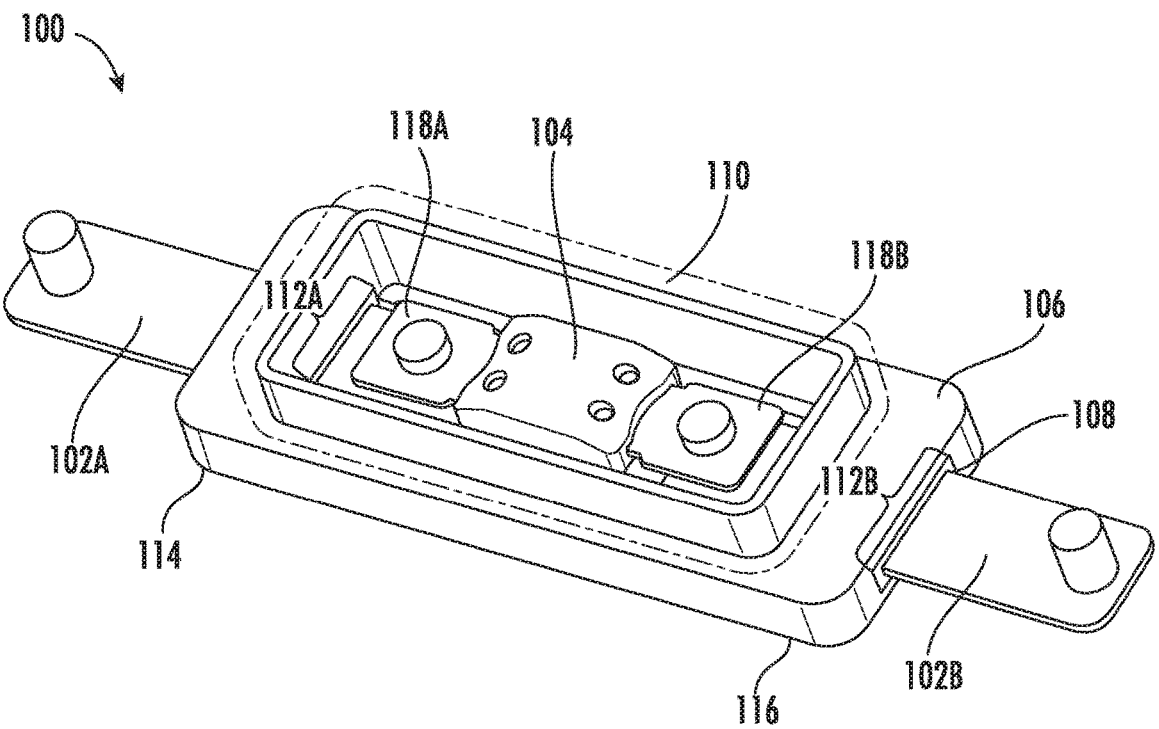
FIG. 1 is a diagram illustrating an electrical fuse box in accordance with exemplary embodiments of the present disclosure.

Referring to FIG. 1, a representative drawing for electrical fuse assemblies 100 is shown in accordance with exemplary embodiments. The electrical fuse assembly 100 (hereinafter "the fuse assembly 100") generally includes two busbars 102A and 102B (collectively, "busbars 102"), a fuse housing 104, terminals 118A, 118B, a base 106, a sealant 108, and a cover 110. The base 106 and the cover 110 form an enclosure for a fusible element of the fuse assembly 100. The busbars 102 are surrounded by the sealant 108, where the sealant 108 is visible in an opening 112B of the base 106. The busbar 102B occupies the opening 112B. The busbar 102A occupies a second opening 112A (a portion of which is shown) (collectively, "openings 112"). In an exemplary embodiment, the openings 112 are rectangular in shape through which the respective busbars 102 are disposed, though the openings 112 may assume a variety of different shapes. As will be shown, the base 106 is an injection molded structure that is formed around the busbars 102.

Busbars 102 may be made from a variety of conductive materials including, but not limited to, copper, tin, silver, zinc, aluminum, alloys including such materials, or combinations thereof. The busbars 102 may be positioned at ends of the fuse assembly 100, for example, with the first busbar 102A disposed at a first end 114 of the base 106 and the second busbar 102B disposed at a second end 116 of the base 106. The busbars 102A, 102B extend through the base 106 via respective openings 112A, 112B (collectively, "openings 112"), and are electrically connected to respective terminals 118A, 118B (collectively, "terminals 118"). For example, the first busbar 102A extends through opening 112A of the base 106 and connects to terminal 118A while the second busbar 102B extends through opening 112B of the base 106 and connects to terminal 118B.

Figure 2:
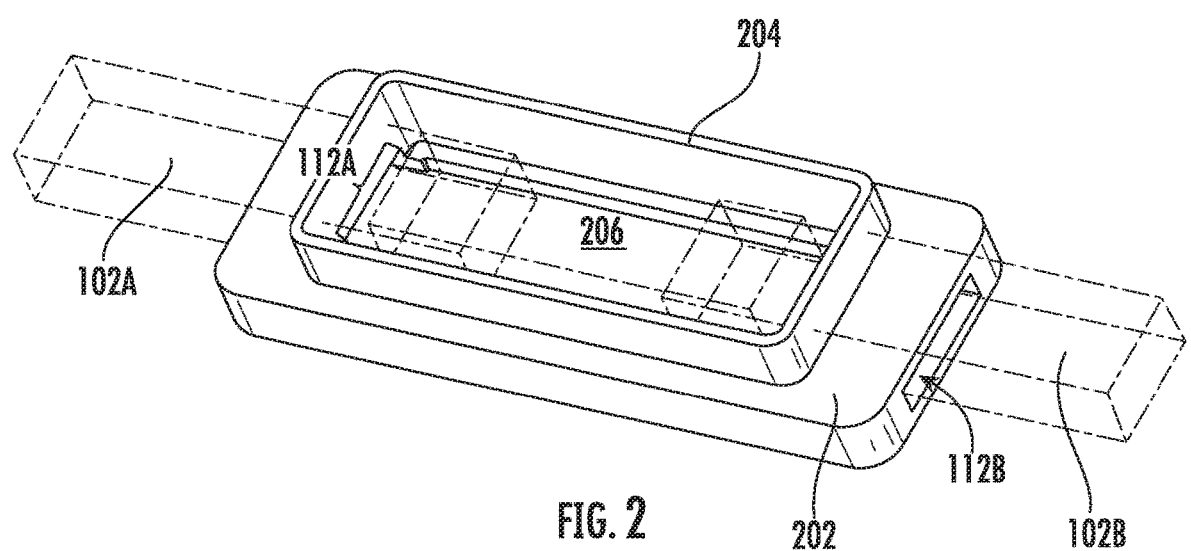
FIG. 2 is a diagram illustrating the injection molded base of the electrical fuse box of FIG. 1 in accordance with exemplary embodiments.

FIG. 2 is a representative drawing of the injection molded base 106 of the fuse assembly 100 of FIG. 1, according to exemplary embodiments. The base 106 includes of a bottom portion 202 and a top portion 204, with the opening or clearance 112 forming a cavity within the bottom portion. Both the bottom portion 202 and top portion 204 are rounded rectangular cubes, although they may be shaped differently without departing from the scope of the present disclosure. The bottom portion 202 is adapted to receive the busbars 102. Skeletal lines indicate that the busbar 102A occupies the left opening 112A of the bottom portion 202 of the base 106 from the left side. Similarly, the busbar 102B occupies right opening 112B of the bottom portion 202 of the base 106 from the right side. The top portion 204 is for receiving the fuse housing 104 including the terminals 118 and for affixing the fuse cover 110. The fuse housing 104 is inserted into an opening 206 of the base 106.

Figure 3A:
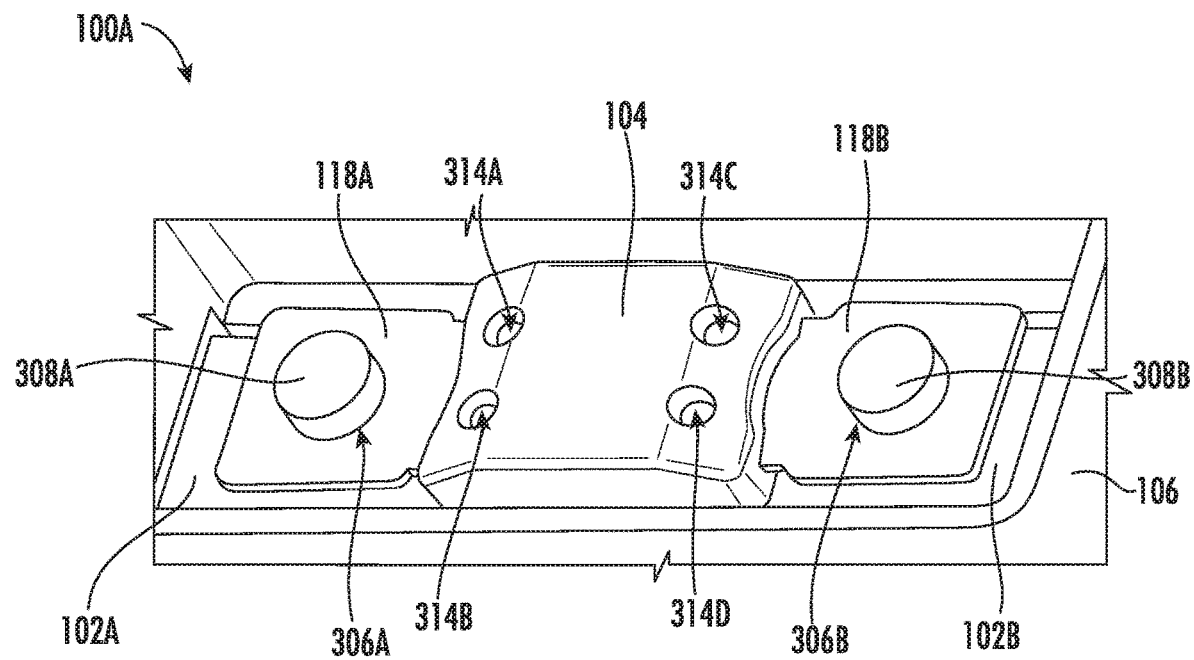
FIGS. 3A and 3B are diagrams illustrating the fuse of the electrical fuse box of FIG. 1 in accordance with exemplary embodiments of the present disclosure.
Figure 3B:
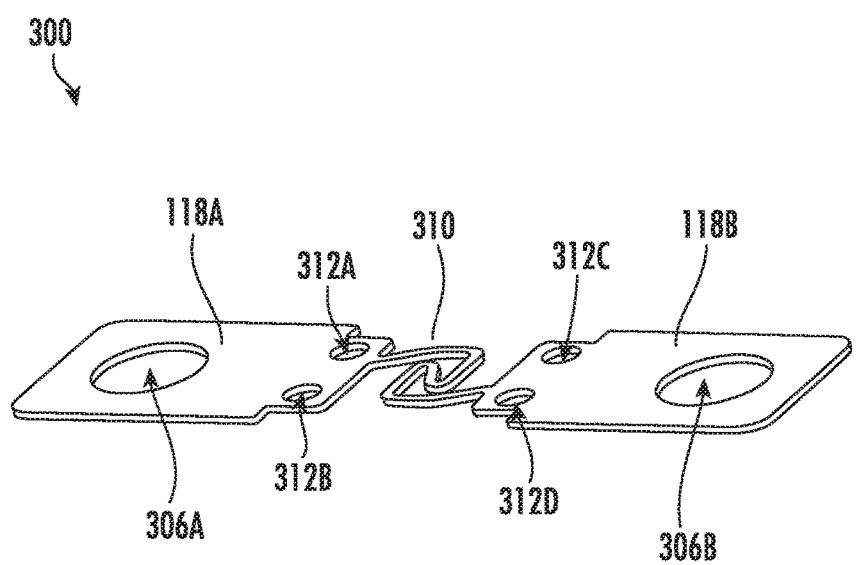

FIGS. 3A and 3B are representative drawings of the fuse assembly 100 of FIG. 1, according to exemplary embodiments. FIG. 3A shows another view 100A of the fuse housing 104 and terminals 118 already introduced while FIG. 3B shows a fusible element assembly 300, made up of an exposed fusible element 310, terminal 118A, and terminal 118B that are part of the fuse assembly 100 of FIG. 1, according to exemplary embodiments.

FIG. 3A shows the fuse housing 104 and terminals 118 while FIG. 3B shows the exposed fusible element 310 that is disposed beneath the fuse housing 104. As described above, the fuse assembly 100 is an electrical safety device inserted into an electronic circuit for overcurrent protection. The fuse element 310 of the fuse assembly 100 is a breakable portion, such as a metal wire or strip, that is adapted to melt or otherwise separate when an amount of current exceeding a current rating of the fuse assembly 100 flows through the fusible element 310. Electrical current flowing through the fuse assembly 100 is thereby arrested in the event of an overcurrent condition, thus protecting connected electrical components. In the illustration of FIG. 3A, the fuse housing 104 hides from view the fusible element 310 of the fusible element assembly 300.

As shown in FIG. 3B, the fusible element assembly 300 further includes the left terminal 118A and the right terminal 118B. The fusible element 310 is disposed between the left terminal 118A and the right terminal 118B. Like the busbars 102, the terminals 118 are made of an electrically conductive material, such as metal, which enables the fusible element 310 to be electrically connected to the rest of the protected electrical circuit. Thus, the left terminal 118A is connected to a left portion of the fusible element 310 while the right terminal 118B is connected to a right portion of the fusible element 310, which is hidden from view by the fuse housing 302 in FIG. 3A but visible in FIG. 3B.

The terminals 118 further include apertures for connecting the fusible element assembly 300 to the fuse housing 104. The terminal 118A includes apertures 312A and 312B while terminal 118B includes apertures 314C and 314D (collectively, "apertures 312"). Similarly, as shown in FIG. 3A, the fuse housing 104 includes apertures 314A-D (collectively, "apertures 314"). Apertures 312 of the fusible element assembly 300 align over respective apertures 314 of the fuse housing 104, enabling the terminals 118 to be connected to the fuse housing 104, such as by disposing screws or bolts through the apertures 312, 314. The fuse housing 104 may consist of a top portion and a bottom portion, where fusible element assembly 300 is sandwiched between the fuse housing 104.

During normal operation of the fuse assembly 100, current flows from busbar 102A to busbar 102B through the fuse element 310 (or vice versa). During an abnormal condition (i.e., an overcurrent condition), the fuse element 310 may melt and separate, and an electrical arc may propagate between the separated ends of the fusible element 310. The electrical arc may vaporize portions of the fusible element 310 within the fuse housing 104. The fusible element 310 may include multiple bends and curvatures, as shown. It will be appreciated that the shape of the fusible element 310 may be varied to suit a desired application so that during arcing, the fusible element 310 quickly vaporizes and isolates protected circuit components to prevent or mitigate damage to such components.

In some embodiments, the terminals 118 have respective connection holes or apertures 306A, 306B (collectively, "apertures 306") for coupling to respective busbars 102. The apertures 306 may be configured to physically and electrically connect the fuse assembly 100 to a source of power and a circuit component. For example, the apertures 306 may be configured to receive a cylindrical protrusion, such as a bolt or post. The busbars 102 each have respective input studs 308A, 308B (collectively, "input studs 308") for fitting through the respective apertures 306. As illustrated in FIG. 3A, the aperture 306A of the left terminal 118A of the fuse assembly 100 is positioned over input stud 308A of the left busbar 102A; similarly, the aperture 306B of the right terminal 118B is positioned over input stud 308B of the right busbar 102B. Although the apertures 306 are circular and the input studs 308 are cylindrical, the apertures 306 may be configured in any shape to receive any shape bolt, post, or other retaining/connecting structure.

The terminals 118 are configured to electrically connect the fuse assembly 100 to a source of power (not shown) and a circuit component to be protected (not shown). The fusible element 310 bridges and electrically connects the terminals 118. In some embodiments, the fusible element 310 is made from the same conductive material as the terminals 118, including for example, copper, tin, silver, zinc, aluminum. In other embodiments, the terminals 118 are made from a different material than fuse element 310. The fuse element 310 may be shaped in any known configuration for providing a circuit interrupt, including but not limited to a wire, a metal link, and an element shaped into multiple bends and/or curves. Various techniques are known for forming the fusible element assembly 300, including, but not limited to, stamping, cutting, and printing, and can include forming the fusible element 310 and the terminals 118 separately or as one piece. If the fusible element 310 and the terminals 118 are formed separately (i.e., in separate pieces), the pieces may subsequently be joined together using various techniques, including, for example, soldering, welding, and other known joining processes.

In the illustrations 300A, 300B, the terminals 118 are generally flat metal pieces; similarly, the busbars 102 are generally flat metal pieces. Once the busbars 102 are in place within the base 106 of the fuse assembly 100, the process of which is described below, the fuse housing 104, including the left and right terminals 118, are placed so that the apertures 306 fit over the input studs 308. The fuse housing 104 is then pushed down so that the terminals 118 and busbars 102 are coupled to one another, with the input studs 308 of each busbar 102 sticking out from the respective apertures 306. In other words, one flat metal piece (the terminal 304) sits atop a second metal piece (the busbar 102) such that an electrical connection between the two metal pieces is possible.

In an exemplary embodiment, the base 106 and the cover 110 of the fuse assembly 100 are produced using injection mold technology. Injection molding is a mechanism for the mass production of plastic parts. Though the actual process is somewhat complex, the core of injection mold technology involves heating plastic pellets until they melt and injecting the melted material into a mold, known as a cavity image. The cavity image is usually made of steel or other metal material. Thus, both the injection molded base 106 and the injection molded cover 110 are made from a plastic material and formed using injection mold technology.

As described above, there are two busbars 102, one on each side of the fuse housing 302 for connection to the fuse housing 104. These busbars 102 are made from metal material, such as copper or other material, as described above. In addition to connecting to the fuse housing 302 as illustrated in FIGS. 3A and 3B, the busbars 102 also connect the fuse housing 104 to other components of the electrical circuit being protected (not shown). Since the base 106 is manufactured using injection mold technology, the metal busbars 102 are inserted into the cavity image that will form the base 106 before the melted plastic material is injected therein. The injected plastic material forms a shape of the base 106 according to the cavity image. Cooling rods disposed around the cavity image will cause the injected plastic material to cool and eventually cure into the shape of the base 106 with the metal busbars 102 embedded in the base 106.

Metals have high surface energy while plastics have lower surface energy. These characteristics make it difficult for metal to bond to plastic. Additionally, factors such as crystallinity and polarity affect the ability of plastics to bond. Materials with high surface energy are easier to wet and adhere to than those with low surface energy. The combination of the metal busbars 102 with the plastic material of the fuse base 106, without more, will generally not facilitate a watertight bond between the disparate materials.

The International Electrotechnical Commission (IEC) promulgates an Ingress Protection code (IP code) that classifies the degree of protection provided by electrical enclosures against intrusion by dust and water. An electrical fuse box suitable for extreme environments in the automotive industry, such as for use with off-road vehicles, construction equipment, trucks, and busses, for example, may have an IP code requirement. The first digit of the IP code indicates the level of solid particle protection while the second digit indicates liquid ingress protection. For example, an enclosure rated as IP67-compliant would be considered "dust-tight", allowing no ingress of dust into the enclosure (the "6" component) while also being water-tight despite the enclosure being immersed into up to 1 meter of water for 30 minutes (the "7" component).

In an exemplary embodiment, the metal busbars 102 of the fuse assembly 100 are partially coated with the sealant material 108 shown in FIG. 1 before being inserted into the cavity image of the injection mold machinery. The sealant 108 enables a more effective bond to be formed between the busbars 102 and the base 106 of the fuse assembly 100. In an exemplary embodiment, the sealant 108 is powder-coated onto the busbars 102.

Powder coating is a process that is used to coat a material, in powder form, usually to a metal part. The powder coating operation uses a powder coating gun connected to an air compressor. An emitter rod in the gun electrically charges the air in front of the gun. Compressed air moves the powder out of the gun where it passes through the charged air and picks up a high-voltage electrical charge. As these charged particles move through the air, they're drawn to the metal part being powder coated, which is grounded by being attached to the ground lead of the powder coating gun. The electrical attraction causes the powder particles to completely coat the surface of the metal. The metal part is then baked in an oven to cure the coating.

Powder coating is considered superior to traditional paint when used with metal parts. In an exemplary embodiment, the sealant 108 is a powder material and the metal busbars 102 of the fuse assembly 100 are powder coated with the sealant 108. The powder coating process ensures a tight bond between the metal of the busbars 102 and the sealant 108. Once the powder-coated sealant 108 is cured on the busbars 102, the sealant is considered affixed to the busbars 102. The busbars 102 are then ready for placement in the cavity image for forming the base 106. A subsequent injection molding operation fills the cavity image with the plastic material making up the base 106 of the fuse assembly 100.

The injection mold process involves the injection of heated liquid plastic into the cavity image. First, the plastic pellets to be melted may be combined with pigment or other materials before being fed into a hopper of the injection mold machine. From the hopper, the plastic pellets enter a barrel chamber surrounded by heating elements that begin to melt the plastic. Further, a reciprocating screw within the barrel chamber facilitates both uniform heating of the pellets and transport of the pellets through the chamber, toward the cavity image. At the end of the chamber, the melted plastic is injected into the cavity image which, in this application, includes the busbars 102. The portion of the busbars 102 that are already coated with the cured sealant 108 are thus surrounded by the melted plastic that will ultimately form the base 106 of the fuse assembly 100. Cooling chambers surround the cavity image to cool the plastic base 106. Finally, the cooled plastic base 106, including the sealant-cured busbars 102, is released from the cavity image.

During the curing step of the powder coating process, a tight bond is formed between the metal of the busbars 102 and the sealant 108. Further, once the plastic base 106 surrounding the busbars cools in the injection mold operation, a tight bond is also formed between the sealant 108 and the plastic of the base 106. Further, in an exemplary embodiment, the heat and pressure of the injection molding process enhances the bonding ability of the sealant 108. In one embodiment, the combination of pressure and heat of the injection molding process creates an environment in which the plastic of the base 106 and the sealant 108 crosslink with one another, forming a strong bond. The resulting bonded material is unable to be separated by a subsequent heating operation because the materials have become irreversibly hardened with one another and cannot be melted. The sealant 108 thus allows two disparate materials, a metal and a plastic, to form a tight bond within the fuse assembly 100. In an exemplary embodiment, the combination of metal (from the busbar), sealant, and plastic (of the base) are dust- and moisture-resistant. In one embodiment, the combination of metal, sealant, and plastic form a seal that makes the fuse assembly 100 IP67-compliant.

Figure 4:
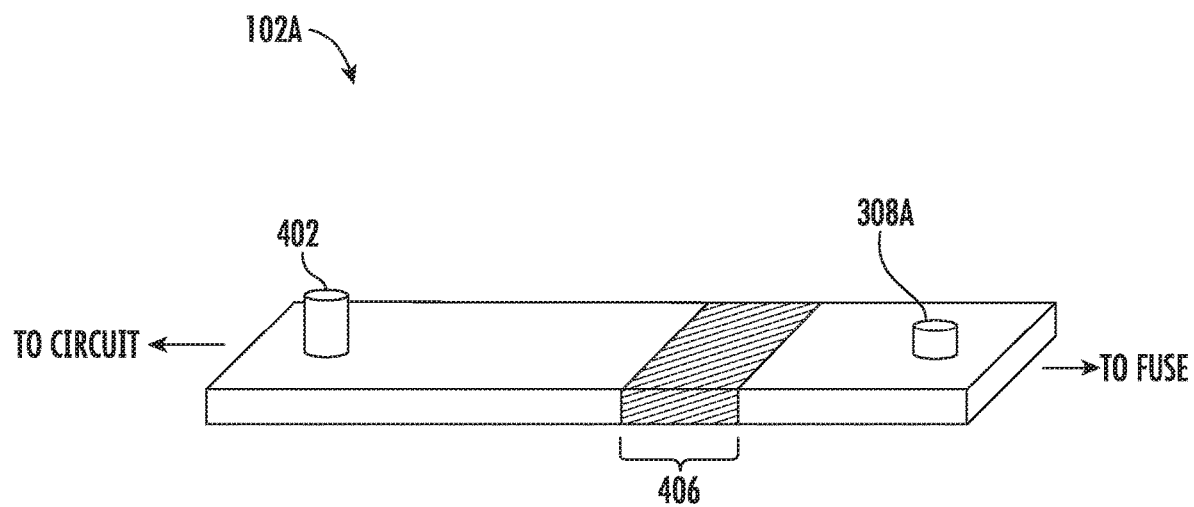
FIG. 4 is a diagram illustrating the busbar of the electrical fuse box of FIG. 1 in accordance with exemplary embodiments of the present disclosure.

FIG. 4 is a representative drawing of the left busbar 102A such as is used in the fuse assembly 100 of FIG. 1, according to exemplary embodiments. This illustration shows that the busbar 102A is a single metal piece that is generally an elongated rectangular cube with two cylindrical input studs 402 and 308A, the latter of which connects to the terminal 118A of the fuse housing 104 (FIGS. 3A and 3B). The input studs 402 enables electrical connection to the circuit being protected, in a manner similar to how the busbars 102 are connected to respective terminals 118, as described above.

Outside the fuse assembly 100, the busbar 102A is an elongated metal piece with the two input studs 402 and 308A at either end for making connections to the circuit and fuse housing 104, respectively, as described above. A portion 406 (shaded) of the busbar 102A is the part of the busbar that will be embedded in the plastic material of the base 106. To the left of the portion 406, the busbar 102A is outside the base 106 of the fuse assembly 100 (see, e.g., FIG. 1). To the right of the portion 406, the busbar 102A is visible in the opening 206 of the base 106 where the fuse housing 104 and terminals 118 are to be placed. In an exemplary embodiment, only the portion 406 of the busbar 102A is powder-coated with the sealant 108, such as for cost savings. In another embodiment, the entire rectangular portion of the busbar 102A is powder-coated with the sealant 108, but the input studs 402 and 308A are not powder-coated. As long as the sealant 108 does not interfere with a connection point, so as to prevent metal-to-metal contact between a busbar and the circuit, at one end, and its respective fuse terminal, at the other end, the busbar 102A may be liberally coated with the sealant 108. The powder-coating of the busbar 102A at the location where the busbar 102A is surrounded by plastic material results in the metal-sealant-plastic bond that renders the fuse assembly 100 both dust- and moisture-resistant.

In one embodiment, the sealant 108 used to manufacture the fuse assembly 100 is a powder-based adhesive that may be used with injection molding operations, in other words, an in-mold adhesive. In another embodiment, the sealant 108 is a heat-activated epoxy available in powder form. In yet another embodiment, the sealant 108 is a spray-on coated adhesive that is pressure- and heat-activated. In another embodiment, the sealant 108 is a cross-linkable adhesion promoter for metal-plastic hybrid components, such as the commercially available product Vestamelt® Hylink, manufactured by Evonik.

Figure 5:
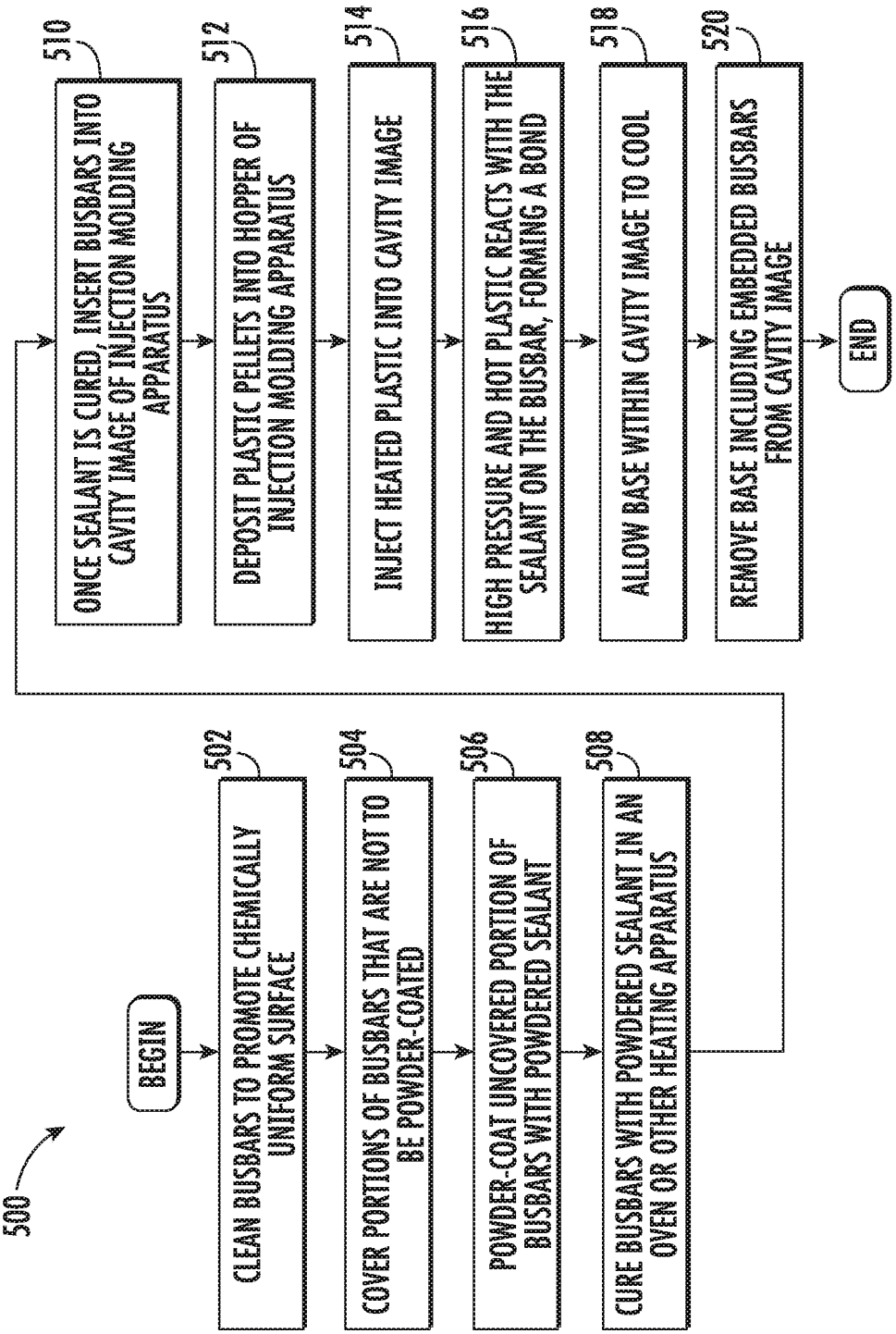
FIG. 5 is a flow diagram illustrating process steps for manufacturing the base of the electrical fuse box of FIG. 1 in accordance with exemplary embodiments of the present disclosure.

FIG. 5 is a flow diagram of the process steps for building the fuse assembly of FIG. 1, according to exemplary embodiments. The busbars 102 may first need to be cleaned, such as by using a degreasing agent, such as isopropanol or acetone (block 502). This leaves the busbars 102 having a substantially chemically uniform surface, which promotes bonding. Further, to avoid contact with skin oils, rubber gloves or handling tools should be used when handling the busbars. Where portions of the busbars are not to be powder-coated, these portions are first covered, such as by using masking tape (block 504). The selected (uncovered) portion of each of the busbars 102 is then powder-coated with the powdered sealant 108 (block 506). In an exemplary embodiment, the coating thickness is between 52 and 94 μm. In an exemplary embodiment, the powdered sealant 108 is applied to the portion of the busbars 102 that will be covered in the plastic material making up the injection mold base 106, such as the portion 406 illustrated in FIG. 4. Once the powder-coat is applied to the busbars 102, they are heated in an oven or other heating apparatus (block 508). In an exemplary embodiment, the busbars are heated for 5-17 minutes at 180-200° C. and the color of the sealant should change from white to transparent when melting is complete. Because of the curing process, a tight bond will be formed between the sealant material 108 and the metal of the busbars 102. Optimally, until they are transported to the injection molding apparatus, the busbars are stored in a method that frees the coated parts from particulates or any other form of contamination.

Once the cured sealant is part of the busbars 102, they are inserted into the cavity image of the injection molding apparatus (block 510). Because each fuse assembly 100 includes two busbars 102, two busbars 102 will be inserted inside each cavity image. In an exemplary embodiment, only the portion of each busbar 102 that is covered with the cured sealant, such as the portion 406, is placed inside the cavity image, while the rest of the busbar 102 lies outside the cavity image. The plastic pellets that are to become the base 106 of the fuse assembly 100 are then deposited into a hopper of the injection molding machine (block 512). The plastic pellets may be mixed with small amounts of pigment called colorant or other materials. The injection molding apparatus heats the plastic pellets until they are in a fluid form. The fluid plastic is then injected into the cavity image (block 514). The high pressure and hot plastic reacts with the sealant on the busbars 102, forming a bond between the sealant 108 and the plastic (block 516). Cooling tubes or other apparatus surrounding the cavity image allows the base 106 within the cavity image to cool (block 518). Finally, the base 106, including the embedded busbars 102 with the powder-coated sealant portion 108 are removed from the cavity image (block 520). A tight bond between the powder-coated sealant 108 of the busbars 102 and the plastic material forming the base 106 is formed. In addition to the fuse assembly 100 of FIG. 1, the method steps of FIG. 5 may be applied to virtually any device in which a metal busbar is over-molded with plastic material as described herein.

Thus, a method of manufacturing a fuse assembly that is dust- and moisture-resistant is disclosed in accordance with exemplary embodiments. By performing powder-coating operations on a portion of the busbar within the assembly, a sealant is deposited upon the busbar, forming a tight bond or seal is formed between the metal of the busbar and the sealant. Further, by including the busbar in the cavity image of the injection mold apparatus, the plastic forming the base of the fuse assembly surrounds the portion of the busbar that has been sealant-cured, thus forming a tight bond or seal between the sealant and the plastic material of the fuse assembly base. Finally, a tight bond or seal between the metal, the sealant, and the plastic makes the fuse assembly both dust- and moisture-resistant and, in an exemplary embodiment, IP67-compliant.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. An injection molded base for production of a fuse assembly, the injection molded base prepared by a process comprising the steps of:
    covering a portion of a busbar with a sealant, wherein a first bond is formed between the busbar and the sealant;
    inserting the busbar into a cavity image of an injection molding apparatus, wherein the portion of the busbar is inside the cavity image;
    injecting melted plastic into the cavity image; and
    removing the injection molded base from the cavity image, the injection molded base being formed from the melted plastic, wherein a second bond is formed between the injection molded base and the sealant;
wherein the first bond and the second bond form a seal that makes the fuse assembly IP 67-compliant.

2. The injection molded base of claim 1, the process further comprising the steps of:
    powder-coating the portion of a busbar with the sealant, the sealant comprising a powder; and
    curing the busbar in an oven until the sealant is cured onto the portion.

3. The injection molded base of claim 1, the process further comprising the steps of cooling the cavity image before removing the injection molded base from the cavity image.

4. The injection molded base of claim 1, the process further comprising the steps of:
    mixing plastic pellets with pigment; and
    adding the plastic pellets to a hopper of the injection molding apparatus.

5. The injection molded base of claim 1, the process further comprising the steps of:
    covering a second portion of a second busbar with the sealant;
    inserting the second busbar into the cavity image, wherein the second portion of the second busbar is inside the cavity image.

6. The injection molded base of claim 1, the process further comprising the steps of:
    cleaning the busbar with a cleaning agent; and
    covering the busbar except for the portion with masking tape.

7. The injection molded base of claim 1, the process further comprising the steps of:
    covering the portion of the busbar with the sealant until the sealant forms a layer of between 52 and 94 µm thick on the busbar.

8. A fuse assembly comprising:
    a fuse;
    a first busbar for establishing a first electrical connection between a circuit and a first side of the fuse;
    a second busbar for establishing a second electrical connection between the circuit and a second side of the fuse; and
    an injection molded base comprising a first opening through which the first busbar is disposed and a second opening through which the second busbar is disposed, wherein the injection molded base is manufactured by:
        covering a first portion of the first busbar with a sealant;
        covering a second portion of the second busbar with the sealant;
        inserting the first busbar and the second busbar into a cavity image of an injection molding apparatus, wherein the first portion and the second portion are inside the cavity image; and
        injecting hot melted plastic into the cavity image;
wherein the sealant fills the first and second openings.

9. The fuse assembly of claim 8, wherein the injection molded base is further manufactured by:
    covering the first busbar with masking tape except for the first portion; and
    covering the second busbar with masking tape except for the second portion;
wherein the sealant only covers the first portion and the second portion.

10. The fuse assembly of claim 8, wherein the injection molded base is further manufactured by:
    allowing the injection molded base to cool while in the cavity image; and
    removing the injection molded base, the first busbar, and the second busbar from the cavity image.

11. The fuse assembly of claim 8, wherein the injection molded base is further manufactured by powder-coating the sealant over the first portion and the second portion, wherein the sealant is in powder form.

12. The fuse assembly of claim 11, wherein the sealant is cured over the first portion and the second portion by baking the first busbar and the second busbar in an oven.

13. The fuse assembly of claim 12, wherein the oven temperature is between 180-200° C. and the busbars are heated for 5-17 minutes.

14. The fuse assembly of claim 13, wherein the sealant is between 52 and 94 µm on the first and second busbars when cured.

* * * * *